United States Patent [19]
Shreev

[11] 3,880,322
[45] Apr. 29, 1975

[54] BALL BEARING FEEDER

[75] Inventor: George E. Shreev, Union City, Ind.

[73] Assignee: Gene B. Symmonds, Indianapolis, Ind.

[22] Filed: Nov. 7, 1973

[21] Appl. No.: 413,588

Related U.S. Application Data

[62] Division of Ser. No. 359,788, May 14, 1973, Pat. No. 3,848,771.

[52] U.S. Cl. ............................................. 221/296
[51] Int. Cl. ............................................. B65g 59/06
[58] Field of Search ........................... 221/298, 296

[56] References Cited
UNITED STATES PATENTS

| | | | |
|---|---|---|---|
| 862,923 | 8/1907 | Linsley | 221/296 |
| 3,410,453 | 11/1968 | Lawrence | 221/298 X |
| 3,733,086 | 5/1973 | Walkerow | 221/298 |

FOREIGN PATENTS OR APPLICATIONS

| | | | |
|---|---|---|---|
| 76,367 | 1/1948 | Czechoslovakia | 221/296 |

*Primary Examiner*—Stanley H. Tollberg
*Attorney, Agent, or Firm*—Woodard, Weikart, Emhardt & Naughton

[57] ABSTRACT

A device for feeding a predetermined number of ball bearings. A rigid tube is rotatably mounted to a frame having a ball bearing receiving chamber therein. The frame has an entrance opening leading to the chamber and an exit opening allowing the ball bearings to pass therethrough. A plurality of hollow stems are positioned within the tube with each stem having a plurality of ball bearings positioned therein. The tube is rotatable to align a stem with the entrance opening. Means are provided to control movement of ball bearings from a stem into the chamber and from the chamber through the exit opening.

2 Claims, 6 Drawing Figures

PATENTED APR 29 1975 3,880,322

BALL BEARING FEEDER

This is a division, of application Ser. No. 359,788, filed May 14, 1973 now U.S. Pat. No. 3,848,771.

BACKGROUND OF THE INVENTION

1. Field of the Invention

This invention is in the field of counting and discharge devices.

2. Description of the Prior Art

Roller rinks repair a number of roller skates during a typical year thereby necessitating insertion of new ball bearings into the wheel races. The ball bearings are small in diameter and thus are difficult to count and pick up. As a result, there is a need for a device which will count and discharge the desired number of ball bearings. In the U.S. Pat. No. 3,410,453 issued to Lawrence, there is shown a device for feeding ball bearings. The Lawrence device is designed to be mounted on a wall or other support and is not designed to be conveniently filled by a worker. Other devices of interest are disclosed in the following U.S. Pat. Nos: 2,889,961 issued to M. J. Belmonte; 2,979,229 issued to R. D. Reeder et al; and 3,212,671 issued to W. A. Rock.

Disclosed herein is a portable ball bearing feeder which may be conveniently held in the worker's hand. The feeder discharges a predetermined number of ball bearings.

SUMMARY OF THE INVENTION

One embodiment of the present invention is a ball bearing feeder comprising a main frame including a chamber with an entrance opening and an exit opening through which a plurality of ball bearings may pass, a rigid tube rotatably mounted to the frame and including a plurality of separate passages each holding a plurality of ball bearings and each alignable with the entrace opening, and first means mounted to the frame operable to control movement of ball bearings through the entrance opening into the chamber and movement out of the chamber through the exit opening.

Another embodiment of the present invention is a ball bearing feeder comprising a container of ball bearings, a tube connected to the container for conveying ball bearings away from the container, and a main frame connected to the tube for receiving the ball bearings, the frame including a chamber with an entrance opening and an exit opening, and first means to control movement of the ball bearings, the first means includes a first spring biased plunger mounted to the frame normally blocking passage of the ball bearings into the chamber but movable to allow passage and further includes a second spring biased plunger mounted to the frame normally blocking passage of the ball bearings from the chamber but movable to allow passage therefrom.

It is an object of the present invention to provide a new and improved ball bearing feeder.

A further object of the present invention is to provide a ball bearing feeder which may be held in a worker's hand and which will discharge a predetermined number of ball bearings.

Related objects and advantages of the present invention will be apparent from the following description.

DESCRIPTION OF THE PREFERRED EMBODIMENT

Figure 1:
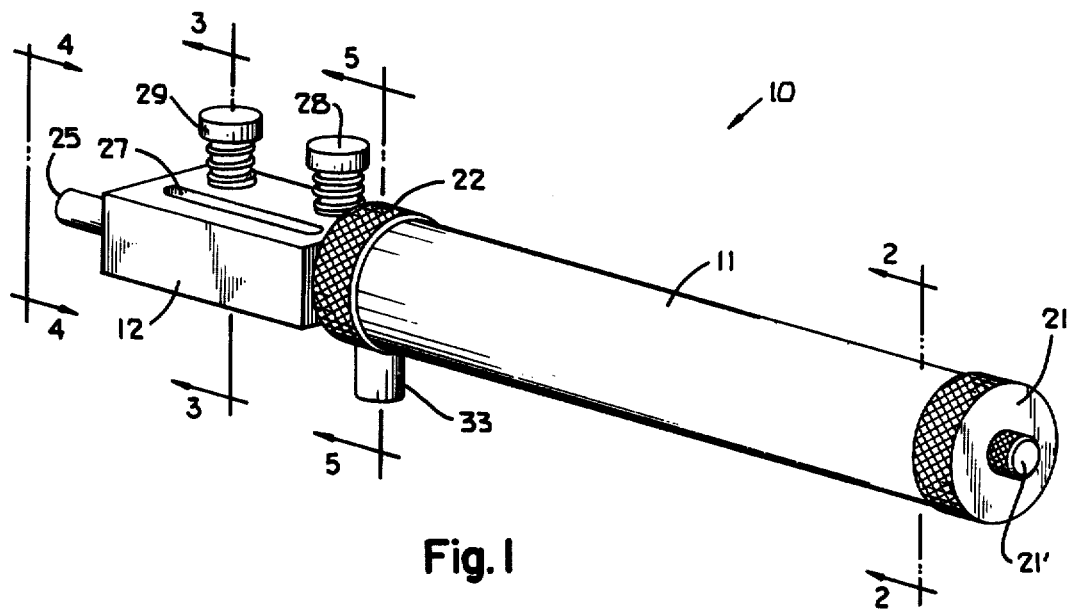
FIG. 1 is a perspective view of a feeder incorporating the present invention.
Figure 2:
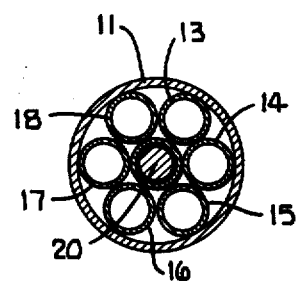
FIG. 2 is a cross sectional view taken along the line 2—2 of FIG. 1 and viewed in the direction of the arrows.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a ball bearing feeder 10 having a rigid tube 11 rotatably mounted to frame 12. Tube 11 includes a plurality of hollow stems 13 through 18 which extend lengthwise through the tube. Each stem 13 through 18 includes a passage for holding a plurality of ball bearings. The stems surround a central tube through which threaded member 20 extends. Member 20 is fixedly mounted in cantilever fashion to frame 12 and extends through cap 21 and threadedly receives an internally threaded fastener 21'. Thus, by removing cap 21 from threaded member 20, device 10 may be loaded by inserting ball bearings into stems 13 through 18.

Fixedly mounted to frame 12 is a cap 22 which receives one end of tube 11. Frame 12 has a chamber 23 which extends therethrough with the chamber provided with an entrance opening 24 and an exit opening 25. Opening 24 extends through the end wall 26 of frame 12 and into tube 11. Thus, tube 11 may be rotated until one of the stems 13 through 18 is aligned with opening 24 allowing the ball bearings within the stem to then move through entrance opening 24.

Chamber 23 is sized to allow the ball bearings to move therethrough only in a single row. A slot 27 is provided in the top wall of frame 12 to allow for the visual observation of the ball bearings within the chamber. A pair of plungers 28 and 29 are movably mounted to frame 12 and are designed to control the flow of ball bearings through passage 23.

Figure 3:
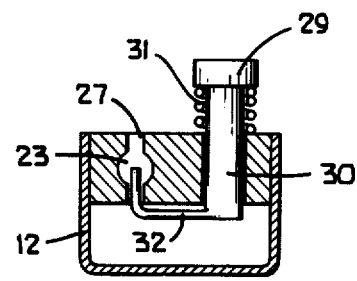
FIG. 3 is a cross sectional view taken along the line 3—3 of FIG. 1 and viewed in the direction of the arrows.
Figure 4:
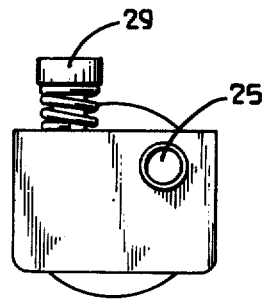
FIG. 4 is an end view looking in the direction of arrows 4—4 of FIG. 1.
Figure 5:
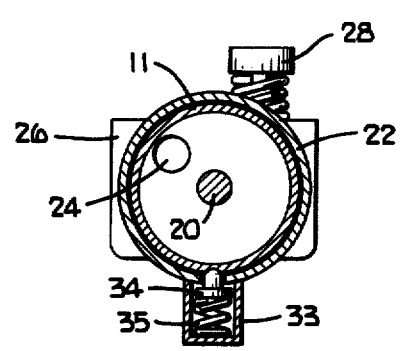
FIG. 5 is a cross sectional view taken along the line 5—5 of FIG. 1 and viewed in the direction of the arrows.

Plunger 29 will now be described it being understood that a similar description applies to plunger 28. Plunger 29 (FIG. 3) includes a main body 30 which slidably projects through the top wall of frame 12. A helical spring 31 is positioned between the enlarged head of the plunger and the top wall of the frame thereby urging the plunger to the upward position. A rigid finger 32 fixedly mounted to main body 30 projects upwardly into passage 23. Thus, ball bearings are prevented from moving from the passage by finger 32 when plunger 29 is in the upward position. When plunger 29 is depressed, finger 32 moves from passage 23 thereby allowing ball bearings to exit the passage. Plunger 28 is positioned at the opposite end of chamber 23 and when depressed allows the ball bearings to move into passage 23. Plunger 28 in the upward position prevents passage of the ball bearings to passage 23 via opening 24. The distance between the fingers of plungers 28 and 29 is fixed so as to allow a predetermined fixed number of ball bearings to be positioned therebetween.

Enclosure 33 is fixedly mounted to cap 22 and houses detent member 34 biased by spring 35 through cap 22 and against tube 11. The outer surface of tube 11 is provided with a plurality of indentations to receive detent 34 to facilitate the positioning of each stem 13 through 18 with respect to entrance opening 24. Detent 34 normally holds tube 11 in place so as to keep one stem aligned with the entrance opening. The detent is yieldable to allow rotation of the tube and alignment of another stem with the entrance opening.

Figure 6:
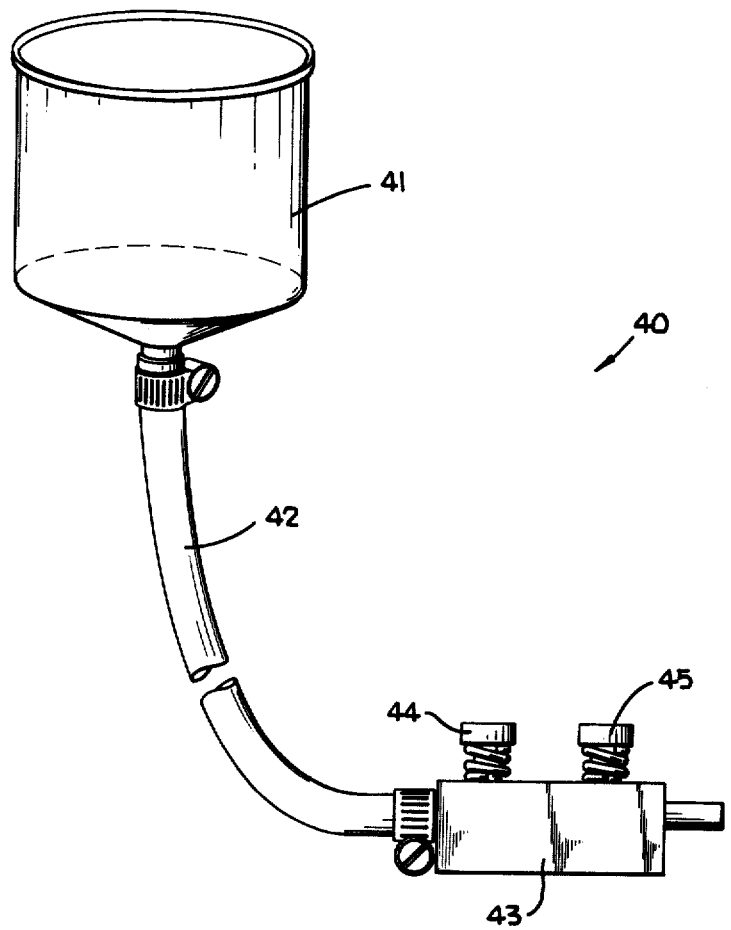
FIG. 6 is a fragmentary perspective view of an alternate embodiment of a feeder incorporating the present invention.

An alternate embodiment of the feeder is shown in FIG. 6. Feeder 40 includes a container 41 having a plurality of ball bearings therein. A flexible hose 42 is connected to and extends between container 41 and frame 43. Frame 43 is identical with frame 12 and includes a pair of plungers 44 and 45 for controlling the movement of ball bearings through a chamber within frame 43. The ball bearings, which are stored in container 41, roll through the hollow interior of hose 42 to the chamber in frame 43 whereat they are dispensed.

It will be obvious from the above description that the present invention provides for a new and improved ball bearing dispenser. It will be further obvious from the above description that the ball bearing feeder disclosed herein is portable and relatively easy to handle.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A ball bearing feeder having a hand held ball bearing discharge block comprising:
    a rigid block including a chamber with an entrance opening and an exit opening through which a plurality of ball bearings may pass, said chamber is sized to allow a predetermined fixed number of ball bearings to be within said chamber in a single row, said block also including an external slot opening into said chamber and extending at least partially from said entrance opening to said exit opening and being sized to prevent said ball bearings from passing through said slot;
    first and second plungers independently operated and slidably mounted to said block adjacent respectively said entrance opening and said exit opening and extending into said chamber, said opening and said exit opening and extending into said chamber, said plungers including springs normally biasing said plungers to block said chamber but yieldable when said plungers are depressed to allow movement of said plungers from said chamber, said plungers are spaced apart a fixed unchangeable distance;
    a flexible tube mounted to said block forming a passage containing a single row of ball bearings, said tube having a top end and a bottom end, said bottom end being connected to said block directing ball bearings within said tube to move through said entrance opening of said block;
    a container of ball bearings elevated relative to said block, said container having an outlet stem connected to said top end of said tube with ball bearings within said container moving therefrom under gravity force through said tube to said block.

2. The feeder of claim 1 wherein:
    each plunger includes a headed top end and a shank integrally connected together with said shank extending slidably through said block adjacent said slot, said shank of each plunger extends through said springs positioned between said block and said headed top end, each plunger further includes a bottom end with a rod attached thereto projecting across said block and into said chamber in a direction toward said headed end, said block includes a cover concealing said rod and said bottom end of each plunger, said block also includes a hollow tube mounted thereon in line with and adjacent said exit opening.

* * * * *